United States Patent [19]

Domas

[11] 4,387,415
[45] Jun. 7, 1983

[54] CORNICE LIGHTING FIXTURE

[75] Inventor: Ben V. Domas, Lake Orion, Mich.

[73] Assignee: Transmatic, Inc., Waterford, Mich.

[21] Appl. No.: 209,448

[22] Filed: Nov. 24, 1980

Related U.S. Application Data

[63] Continuation of Ser. No. 34,301, Apr. 30, 1979, abandoned.

[51] Int. Cl.³ .............................................. B60Q 1/00
[52] U.S. Cl. ..................................... 362/74; 362/151
[58] Field of Search ...................... 362/74, 147, 151; 427/389.8, 407.3; 428/268

[56] References Cited

U.S. PATENT DOCUMENTS

| | | | |
|---|---|---|---|
| 2,650,184 | 8/1953 | Biefeld | 427/407.3 |
| 2,948,950 | 8/1960 | Finger | 428/268 |
| 3,210,875 | 10/1965 | Schwenkler | 362/74 |
| 4,157,584 | 6/1979 | Bhatt | 362/74 |

Primary Examiner—Donald P. Walsh
Attorney, Agent, or Firm—Reising, Ethington, Barnard, Perry, Brooks & Milton

[57] ABSTRACT

A cornice lighting fixture (10) disclosed is designed for use on public transit vehicles (12) and includes a unitary member (20) defining a light housing (22) and a trim panel (24) that extends horizontally and vertically from the light housing. A light cover (28) encloses a fluorescent tube (26) mounted within the housing by an electrical connector support (84). The unitary member defining the housing and trim panel is preferably made as a pultrusion from resin and glass fibers so as to have an elongated shape of a uniform cross-section with the light housing defining an upper and inward longitudinal margin of the fixture and with an outer mounting flange (70) of the trim panel defining a lower and outward longitudinal margin of the fixture. Upon mounting of the fixture, the housing and the trim panel cooperate to partially define an air duct (30) for carrying heated or cooled air. A horizontal wall (44) of the housing has an inward securement formation (50, 52) that receives an upper edge (54) of the light cover while a vertical wall (60) of the housing extends downwardly from the horizontal wall thereof for connection to the trim panel at which connection a cover mounting flange (62) extends inwardly to secure a lower edge (64) of the light cover. The trim panel has a curved shape that is concave with respect to the interior of the vehicle and also has upper and lower tabs (32, 34) for mounting an advertising sign thereon so that light shining through the cover illuminates the sign from its front side.

6 Claims, 3 Drawing Figures

CORNICE LIGHTING FIXTURE

This is a continuation of application Ser. No. 34,301 filed Apr. 30, 1979, now abandoned.

TECHNICAL FIELD

This invention relates to a cornice lighting fixture for public transit vehicles.

BACKGROUND ART

One type of cornice lighting fixture for public transit vehicles is disclosed by U.S. Pat. Nos. 3,210,875; 3,211,904; and Des.201,380. The type of lighting fixture disclosed by these patents includes a metal housing for mounting one or more fluorescent tubes and a light transmitting panel that covers the fluorescent tubes. Spaced lens sections of the light transmitting panel are extruded from clear plastic to define triangular prisms for directing light from the fixture for general illumination and reading light. An intermediate section of the light transmitting panel is extruded from translucent plastic and extends between the spaced lens sections. Advertising signs may be mounted on the intermediate section and may either be opaque so that the indicia on the sign is lighted from the front or may be translucent so as to be back-lighted by the light shining through the translucent intermediate section.

Another type of cornice lighting fixture designed for use with public transit vehicles includes a metal housing for supporting one or more fluorescent tubes and an extruded light cover of all translucent plastic through which the fluorescent tubes provide diffused light. An advertising sign can also be carried by the translucent cover of this type of fixture so that the sign is lighted by the general illumination within the vehicle if it is opaque or is lighted by light shining through the cover if the sign is translucent. Light is diffused by all portions of this type of lighting fixture rather than being directed by lens sections as disclosed by the aforementioned patents.

Both types of cornice lighting fixtures discussed above have been utilized such that the metal housings thereof partially define an air duct upon mounting so the duct can carry either heated or cooled air for appropriately controlling the temperature within the associated transit vehicle. Such housings must be generally imperforate so that dust or other accumulation that is carried with the heated or cooled air does not collect on the plastic cover through which light shines into the interior of the vehicle.

Whatever the type of lighting fixture utilized with public transit vehicles, the cost of the fixture is a very important consideration in view of the financial condition of most public transit systems.

DISCLOSURE OF INVENTION

An object of the present invention is to provide an improved cornice lighting fixture for public transit vehicles so as to be economical to manufacture and install as well as effective in use.

In carrying out the above object and other objects of the invention, the cornice lighting fixture includes a unitary member of an elongated shape whose cross-section defines a light housing at one longitudinal margin of the fixture and defines a trim panel that extends vertically and horizontally from the light housing to another longitudinal margin of the fixture. An electrical connector support is provided to mount a fluorescent tube on the light housing such that a light cover of the fixture encloses the tube within the housing.

In the preferred construction disclosed, the unitary member of the fixture is made as a pultrusion from opaque resin and glass fibers with the light housing located at an upper and inward extremity of the fixture and the trim panel extending downwardly and outwardly to the lower and outward extremity of the fixture. Both the trim panel and the housing defined by the unitary member cooperate with an associated transit vehicle upon mounting of the fixture to define an air duct for heated or cooled air used to thermally condition the vehicle. A curved shape of the trim panel is concave with respect to the interior of the vehicle and upper and lower tabs on the trim panel provide for mounting of an advertising sign that is illuminated by light shining through the light cover onto the front face of the sign.

The preferred construction of the light housing defined by the unitary member includes a horizontal wall with an inward securement formation provided by a pair of flanges so as to define a groove that receives an upper edge of the light cover. A vertical wall of the housing extends downwardly from an outward extremity of the horizontal wall and is connected to the trim panel at a location from which a cover mounting flange projects inwardly to secure a lower edge of the light cover. At its lower and outward extremity, the curved trim panel includes a mounting flange for securing the fixture. The mounting flange includes a horizontal connection portion and a vertical connection portion that extends upwardly from the horizontal connection portion as well as a distal mounting portion that extends horizontally from the vertical connection portion in a manner that conceals securement screws used to mount the fixture.

End caps of the fixture are mounted within the light housing defined by the unitary member and each has a flange that engages the housing as well as the mounted light cover while carrying an associated electrical connector of the support that is used to mount a fluorescent tube within the housing.

Polyester resin is preferably used to make the unitary member along with the glass fibers as a pultrusion so as to have high strength and a hard surface that resists scratching as well as good chemical resistance to cleaning liquids. Polycarbonate plastic is preferably used to extrude the light cover with solid particles dispersed therethrough so as to have a translucent nature, e.g. of a white color, and high strength so as to resist breakage.

The objects, features, and advantages of the present invention are readily apparent from the following description of the best mode for carrying out the invention when taken in connection with the accompanying drawings.

BEST MODE FOR CARRYING OUT THE INVENTION

Figure 1:
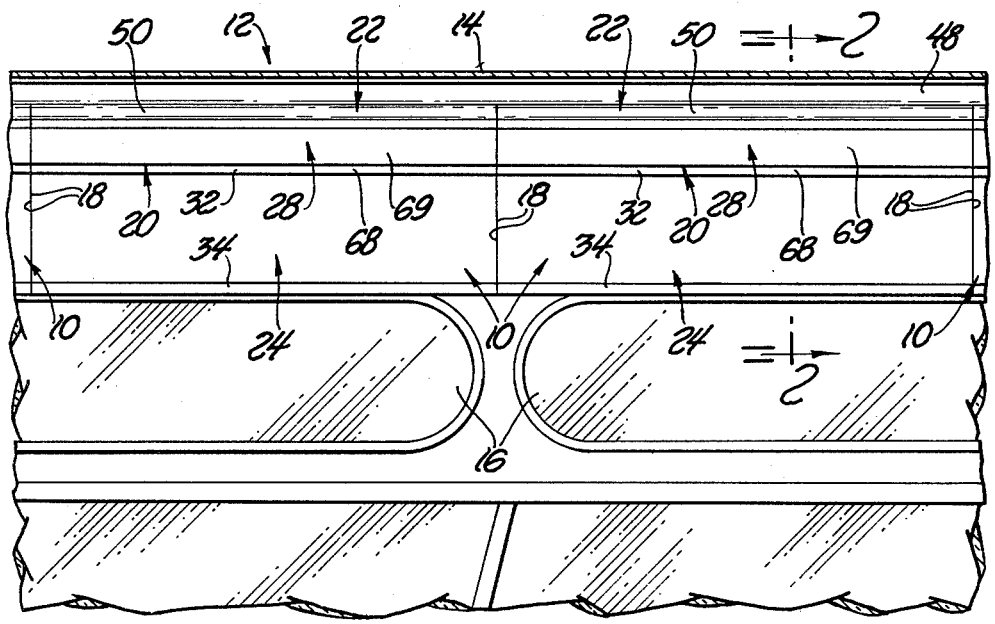
FIG. 1 is an elevation view taken longitudinally looking in an outward direction within the interior of a public transit vehicle on which is mounted a cornice lighting fixture constructed in accordance with the present invention.

Referring to FIG. 1 of the drawings, cornice lighting fixtures 10 constructed in accordance with the present invention for use on public transit vehicles are shown mounted within a bus 12 on the roof 14 thereof just above side windows 16. Ends 18 of the fixtures 10 are located adjacent each other so as to provide a continuous cornice structure along the length of the bus.

Figure 2:
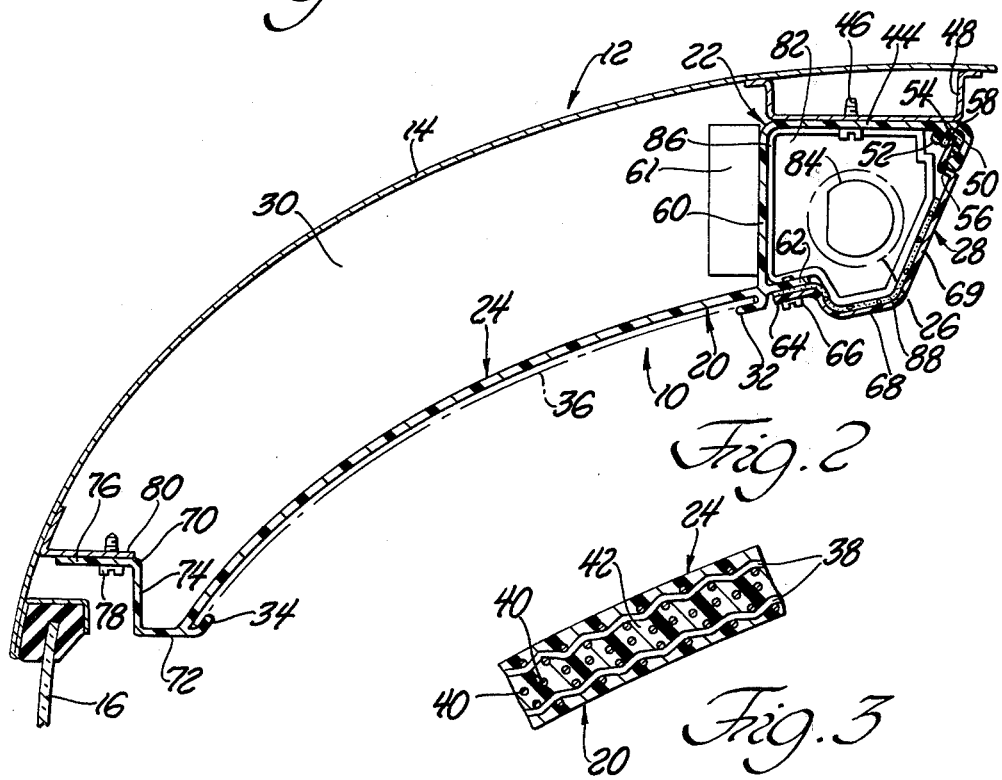
FIG. 2 is a cross-sectional view through the vehicle and the cornice lighting fixture along line 2—2 of FIG. 1.

With additional reference to FIG. 2, each lighting fixture 10 includes a unitary member 20 of an elongated shape that has a uniform cross-section along its length. As will be hereinafter more fully described, the unitary member 20 is preferably made from resin that is opaque and glass fibers as a pultrusion and includes a light housing 22 that defines an upper and inward longitudinal margin of the fixture and also includes a trim panel 24 that extends vertically and horizontally from the light housing in downward and outward directions to define a longitudinal lower and outward margin of the fixture. A fluorescent tube 26 is mounted on the light housing 22 by an electrical connector support and is enclosed by a light cover 28 that is preferably extruded from polycarbonate plastic of a translucent composition, e.g. of a white color, so as to diffuse the light which shines through the cover and thereby illuminates the interior of the bus.

It should be noted that the light housing 22 and trim panel 24 defined by the unitary member 20 of the lighting fixture cooperate with the bus roof 14 as shown in FIG. 2 to define an air duct 30 for carrying heated or cooled air used to thermally condition the interior of the bus through suitable registers which are not shown. Trim panel 24 has a curved shape that extends downwardly and outwardly from the light housing 22 in a concave relationship with respect to the interior of the bus so as to increase the available head room below the fixture. Upper and lower tabs 32 and 34, respectively, of the trim panel 24 provide for mounting of an advertising sign 36 which is shown by phantom line representation. Light which shines through the light cover 28 to provide general illumination to the vehicle will also shine onto the front face of the advertising sign 36.

Figure 3:
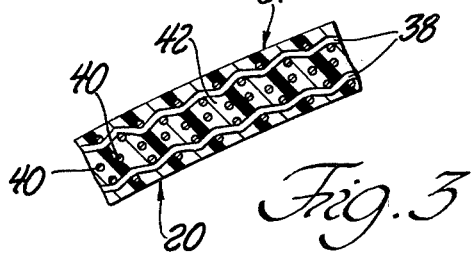
FIG. 3 is a view that illustrates the cross-sectional construction of a unitary member of the fixture which is made as a pultrusion from resin and glass fibers.

The manner in which the unitary member is made as a pultrusion will now be described with reference to FIG. 3 which shows a portion of the trim panel 24 whose thickness is shown in a larger scale than in FIG. 2 for purposes of illustration. Spaced layers of cloth 38 made from glass fibers are located on opposite sides of longitudinally extending glass fibers 40 and are all embedded within a cured layer 42 of polyester resin that integrates the glass cloth and fibers into a unitary member. Polyester resin that is cured to form the layer 42 is opaque, e.g. of an off-white color, and preferably includes a suitable fire retardant so as to resist combustion. Good resistance to scratching and cleaning liquids is provided by the cured layer 42 of polyester resin. Fabrication of the unitary member 20 is performed by suitable processing machinery that first coats each of the layers of glass cloth 38 and the longitudinally extending glass fibers 40 with the polyester resin and then pulls the cloth and fibers over a suitable mandrel and through a hot curing die in which the resin cures to a hardened condition in the shape illustrated. Rollers downstream from the curing die provide the pulling action which feeds both layers of the glass cloth 38 and the glass fibers 40 from suitable storage rolls for passage through baths of the resin prior to shaping on the mandrel and passage through the die. Pultrusion fabrication of the type involved is well known and, as such, will not be further described in greater detail.

As seen in FIG. 2, the light housing 22 includes a horizontal wall 44 that is secured by screws 46 (only one shown) to the underside of a molding 48 that is welded to the bus roof 14. At its inward extremity, the horizontal wall 44 includes a cover securement formation provided by a face flange 50 and a hidden flange 52 that cooperatively define a groove for receiving an upper edge 54 of the light cover 28. An ogee shape 56 extruded in the light cover 28 adjacent the upper edge thereof provides a flush condition of the light cover with the face flange 50 and a seal 58 on the upper edge 54 thereof prevents rattling of the mounted light cover. At the outward extremity of the horizontal light housing wall 44, a vertical wall 60 of the light housing extends downwardly to a connection with the upper edge of the trim panel 24 adjacent the upper tab 32 that is utilized to mount the advertising sign 36. An inverter 61 for the fixture circuitry is mounted on the vertical housing wall 60 at a suitable location along the length of the fixture. A cover mounting flange 62 of the unitary member 20 extends inwardly and slightly upwardly from the connection of the vertical housing wall 60 with the trim panel 24 and is engaged by a lower edge 64 of the light cover 28 with securement thereof provided by a plurality of screws 66 of which only one is shown.

Light cover 28 has a cross-section that includes a lower trough 68 extending downwardly from its edge 64 in order to provide diffusion of light onto the front face of the advertising sign 36 as well as adjacent the window 16. The light cover 28 also includes an inclined front face 69 that extends upwardly from the lower trough to the ogee shape 56 flush with the face flange 50 as previously mentioned.

As seen in FIG. 2, trim panel 24 extends downwardly and outwardly with its curved shape from the lower extremity of the vertical wall 60 of the light housing 22 and has an outer mounting flange 70 that defines a lower and outward extremity of the fixture. Mounting flange 70 includes a horizontal connection portion 72 that extends outwardly from the lower sign tab 34 and also includes a vertical connection portion 74 that extends upwardly from the horizontal connection portion as well as including a distal mounting portion 76 that extends horizontally in an outward direction from the upper end of the vertical connection portion. A plurality of screws 78 secure the mounting portion 76 of the flange 70 to a molding 80 that is welded onto the bus roof 14. It will be noted that the configuration of the mounting flange 70 conceals the securement screws 78 from sight while still permitting access thereto for installation or removal.

Fixture end caps 82 such as illustrated in FIG. 2 are mounted within the light housing 22 and each has an associated electrical connector 84 so as to cooperate in pairs to mount the ends of an associated fluorescent light tube. Normally two such end caps 82 will be provided with each fixture so that a fluorescent tube of a corresponding length will be supported therebetween; however, it is also possible to utilize tubes of a length that corresponds to the combined length of two or more fixtures so the tube will thus bridge adjacent ends of the fixtures and hence eliminate the requirement for two end caps on each fixture. Each end cap 82 includes a peripheral flange 86 that is adhesively secured to the horizontal and vertical walls 44 and 60, respectively, of the light housing 22 and to the cover mounting flange 62. A foam seal 88 on the ends of the light cover 28 engages the peripheral flange 86 of the end cap 82 in order to prevent the entry of dirt and other accumulation into the interior of the housing.

While the best mode for carrying out the invention has herein been described in detail, those familiar with the art to which this invention relates will recognize various alternative designs and constructions for practicing the invention as defined by the following claims.

What is claimed is:

1. A cornice lighting fixture for public transit vehicles, the lighting fixture comprising: a unitary member made as a pultrusion from resin and glass fibers so as to have an elongated shape with a uniform cross section along the length thereof, said unitary member including a light housing that defines one longitudinal margin of the fixture and a trim panel that extends vertically and horizontally from the light housing to define another longitudinal margin of the fixture, said light housing opening toward the direction in which light is to be provided by the fixture, said trim panel including one extremity defining the longitudinal fixture margin opposite the longitudinal fixture margin defined by the housing, said one extremity of the trim panel having a tab adapted to mount one edge of an advertising card on the trim panel, said trim panel also including another extremity connected directly to the housing in a fixed relationship thereto and having another tab adapted to mount another edge of the advertising card such that the card is positioned immediately adjacent the light housing; an electrical connector support for mounting a fluorescent tube on the light housing; and a light cover for cooperating with the light housing to enclose a mounted fluorescent tube within the housing.

2. A cornice lighting fixture for public transit vehicles, the lighting fixture comprising: a unitary member of an elongated shape having a uniform cross-section along the length thereof; said unitary member including an upper light housing that defines a longitudinal upper and inward margin of the fixture; said light housing opening toward the direction in which light is to be provided by the fixture; the unitary member also including a trim panel that extends downwardly and outwardly from the light housing to define a longitudinal lower and outward margin of the fixture and to also partially define an air duct upon mounting of the fixture; said trim panel including one extremity defining the lower and outward margin of the fixture; said one extremity of the trim panel having a tab adapted to mount the lower edge of an advertising card on the trim panel; said trim panel also including another extremity connected directly to the housing in a fixed relationship thereto and having another tab adapted to mount the upper edge of the advertising card such that the card is positioned immediately adjacent the light housing; an electrical connector support for mounting a fluorescent tube on the light housing; and a light cover for cooperating with the light housing to enclose a mounted fluorescent tube within the housing.

3. A cornice lighting fixture for public transit vehicles, the lighting fixture comprising: a unitary member made as a pultrusion from opaque resin and glass fibers so as to have an elongated shape of a uniform cross-section along the length thereof; said unitary member including a light housing that defines a longitudinal upper and inward margin of the fixture; the light housing having a horizontal wall with an inward securement formation and also having a vertical wall extending downwardly from the outward extremity of the horizontal wall; said light housing opening toward the direction in which light is to be provided by the fixture; the unitary member also including a trim panel having an inward extremity connected directly to the lower extremity of the vertical wall of the light housing in a fixed relationship thereto and extending downward and outwardly therefrom with a curved shape that is concave with respect to the interior of the vehicle; said curved trim panel having an outer mounting flange that defines a lower and outward margin of the fixture; upper and lower tabs on the trim panel respectively located at the connection of the trim panel to the light housing and adjacent the outer mounting flange and cooperable to mount an advertising sign thereon immediately adjacent the light housing; the housing and trim panel cooperating with an associated vehicle to define an air duct upon mounting of the fixture; the unitary member including a cover mounting flange extending inwardly from the connection of the trim panel to the vertical wall of the light housing; an electrical connector support for mounting a fluorescent tube on the light housing; and a light cover for cooperating with the light housing to enclose a mounted fluorescent tube within the housing and having an upper edge received by the securement formation of the horizontal wall on the light housing and also having a lower edge secured to the cover mounting flange.

4. A lighting fixture as in claim 3 further including at least one end cap mounted within the housing of the unitary member and having a flange that engages the housing and the light cover.

5. A lighting fixture as in claim 3 wherein the outer mounting flange of the trim panel includes a horizontal connection portion, a vertical connection portion that extends upwardly from the horizontal connection portion, and a distal mounting portion that extends horizontally from the vertical connection portion.

6. A lighting fixture as in claim 3 wherein the securement formation on the horizontal wall of the light housing includes a pair of flanges defining a groove that receives the upper edge of the light cover.

* * * * *

REEXAMINATION CERTIFICATE (1857th)
United States Patent [19]
Domas

[11] B1 4,387,415
[45] Certificate Issued  Dec. 1, 1992

[54] CORNICE LIGHTING FIXTURE

[75] Inventor: Ben V. Domas, Lake Orion, Mich.

[73] Assignee: Transmatic, Inc., Drayton, Mich.

Reexamination Request:
No. 90/002,450, Sep. 30, 1991

Reexamination Certificate for:
Patent No.: 4,387,415
Issued: Jun. 7, 1983
Appl. No.: 209,448
Filed: Nov. 24, 1980

[51] Int. Cl.$^5$ .............................................. B60Q 1/00
[52] U.S. Cl. .................................... 362/74; 362/151
[58] Field of Search ........................................... 362/74

[56] References Cited
U.S. PATENT DOCUMENTS

| | | |
|---|---|---|
| 2,587,807 | 3/1952 | Arenberg . |
| 2,650,184 | 8/1953 | Biefeld . |
| 2,948,950 | 8/1960 | Finger . |
| 3,035,161 | 5/1962 | Kalt . |
| 3,210,875 | 10/1965 | Schwenkler . |
| 4,157,584 | 6/1979 | Bhatt . |
| 4,252,696 | 2/1981 | McQuarrie . |

OTHER PUBLICATIONS

Glaspul Publication "Luggage Rack From One-Piece Wide Pultrusion", The Pultrusion Corp. (No Date).
R. A. P. Spencer, "Pultrusion of Glass Reinforced Polyester-A New Approach in U.K.", *Proceedings of Reinforced Plastics Congress*, 1976, Nov. 8-11, Brighton, England.
John D. Tickle, "Current Capabilities of Reinforced Plastic Pultrusion", 1973, *Proceedings of International Automotive Engineering Congress*, Detroit, Michigan.
John D. Tickle "Pultrusions Step Up Challenge to Structural Steel," Machine Design, 1977, vol. 49, No. 24, pp. 163–167.
A. Stuart Wood, "Pultrusion is Poised for New Growth and It Won't All Be in Thermosets," Modern Plastics, 1976, Jun. pp. 46–47.

*Primary Examiner*—Richard R. Cole

[57] ABSTRACT

A cornice lighting fixture (10) disclosed is designed for use on public transit vehicles (12) and includes a unitary member (20) defining a light housing (22) and a trim panel (24) that extends horizontally and vertically from the light housing. A light cover (28) encloses a fluorescent tube (26) mounted within the housing by an electrical connector support (84). The unitary member defining the housing and trim panel is preferably made as a pultrusion from resin and glass fibers so as to have an elongated shape of a uniform cross-section with the light housing defining an upper and inward longitudinal margin of the fixture and with an outer mounting flange (70) of the trim panel defining a lower and outward longitudinal margin of the fixture. Upon mounting of the fixture, the housing and the trim panel cooperate to partially define an air duct (30) for carrying heated or cooled air. A horizontal wall (44) of the housing has an inward securement formation (50, 52) that receives an upper edge (54) of the light cover while a vertical wall (60) of the housing extends downwardly from the horizontal wall thereof for connection to the trim panel at which connection a cover mounting flange (62) extends inwardly to secure a lower edge (64) of the light cover. The trim panel has a curved shape that is concave with respect to the interior of the vehicle and also has upper and lower tabs (32, 34) for mounting an advertising sign thereon so that light shining through the cover illuminates the sign from its front side.

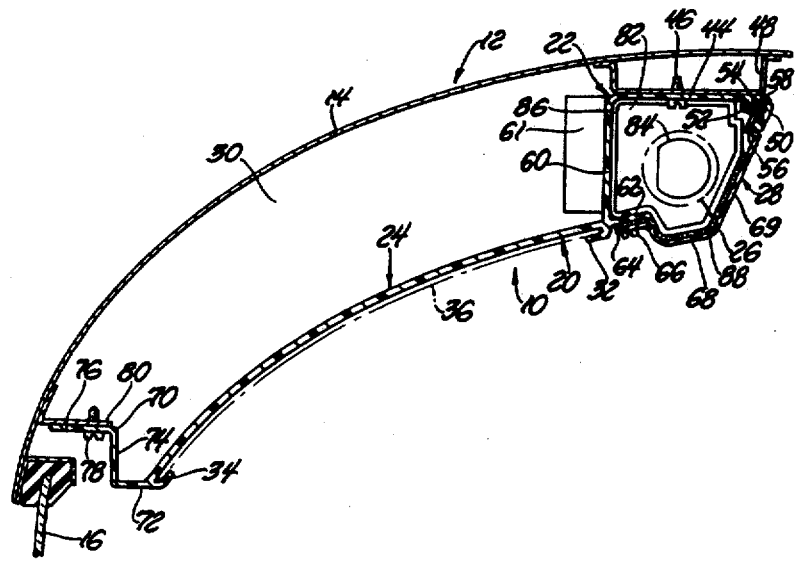

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 3–6 is confirmed.

Claim 2 is determined to be patentable as amended.

2. A cornice lighting fixture for public transit vehicles, the lighting fixture comprising: a *single-piece* unitary member of an elongated shape having a uniform cross-section along the length thereof; said unitary member including an upper light housing that defines a longitudinal upper and inward margin of the fixture; said light housing opening toward the direction in which light is to be provided by the fixture; the unitary member also including a trim panel that extends downwardly and outwardly from the light housing to define a longitudinal lower and outward margin of the fixture and to also partially define an air duct upon mounting of the fixture; said trim panel including one extremity defining the lower and outward margin of the fixture; said one extremity of the trim panel having a tab adapted to mount [the] *a* lower edge of an advertising card on the trim panel; said trim panel also including another extremity connected directly to the housing in a fixed relationship thereto and having another tab adapted to mount [the] *an* upper edge of the advertising card such that the card is positioned immediately adjacent the light housing; an electrical connector support for mounting a fluorescent tube on the light housing; and a light cover for cooperating with the light housing to enclose a mounted fluorescent tube within the housing.

* * * * *